Patented Oct. 10, 1922.

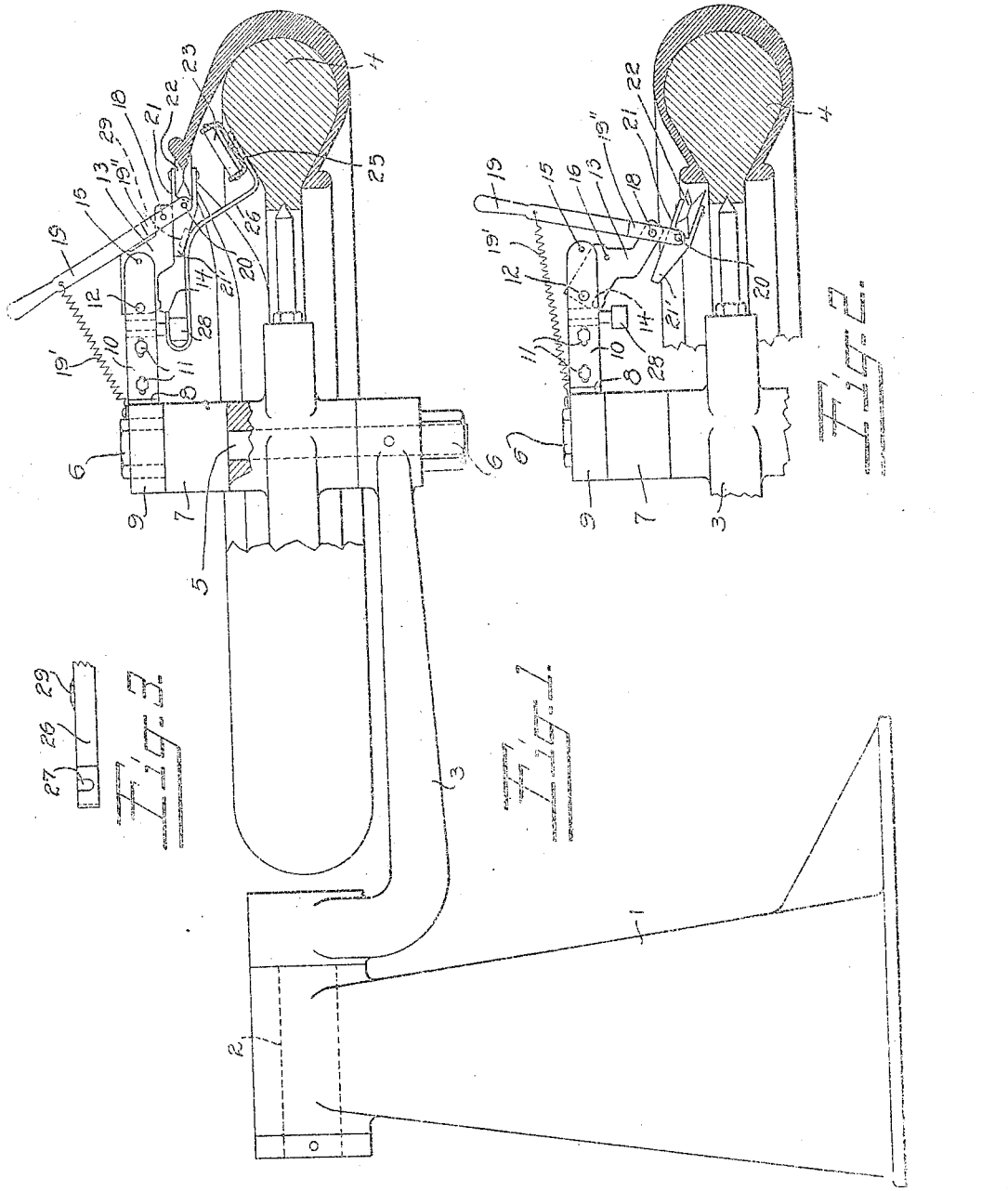

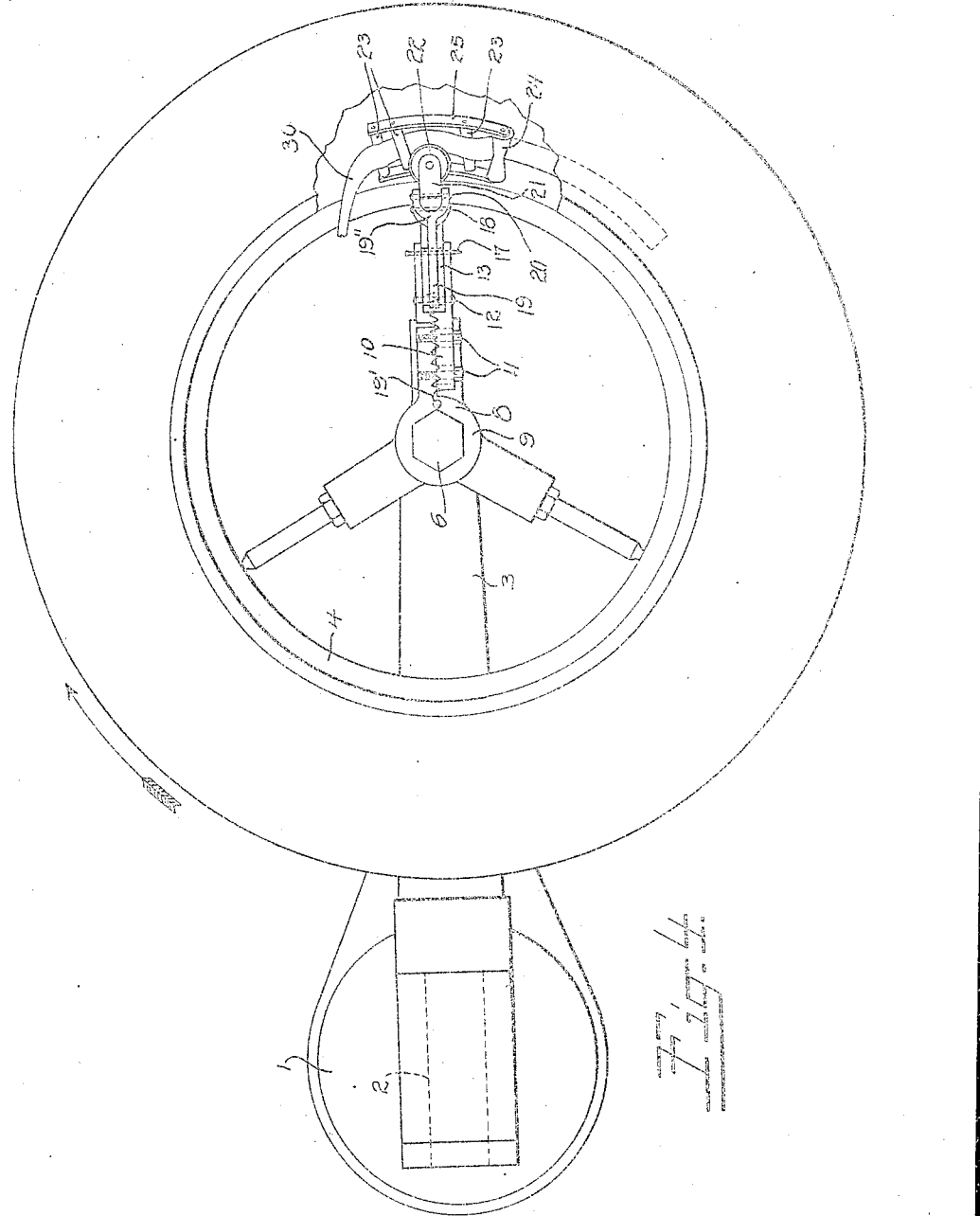

1,431,403

UNITED STATES PATENT OFFICE.

WILLIAM KEARNS AND HENRY P. CONNELLY, OF DETROIT, MICHIGAN, ASSIGNORS TO MORGAN & WRIGHT, A CORPORATION OF MICHIGAN.

APPARATUS FOR REFINISHING BLEMISHED TIRES.

Application filed June 15, 1921. Serial No. 477,616.

*To all whom it may concern:*

Be it known that we, WILLIAM KEARNS and HENRY P. CONNELLY, both citizens of the United States, and residents of Detroit, county of Wayne, and State of Michigan, have invented a certain new and useful Apparatus for Refinishing Blemished Tires, of which the following is a full, clear, and exact description.

This invention relates to an apparatus for re-finishing blemished tires.

Owing to an insufficient quantity of rubber composition, or to the formation of air or moisture pockets, it frequently happens in the curing of tires that their exterior surfaces are not completely and perfectly molded. The present invention aims to provide an apparatus for re-curing such superficially imperfect tires and to make them substantially indistinguishable from those which come out perfect in the usual final cure and compared to which they are otherwise as durable and serviceable. It further aims to provide a simple apparatus for permitting this to be done without much manual labor and comparatively rapidly and inexpensively.

With the preferred embodiment of the invention in mind and without intention to unnecessarily limit its scope, the invention consists briefly in introducing a filling strip between a blemished tire and a core on which it has been cured, or mounted after curing. To conveniently introduce the strip a spreading tool is provided for distending or shifting a bead of the tire and holding the adjacent side wall away from the core, and one or more strip smoothing members are associated therewith to guide the strip and lay it flat directly upon the core. The apparatus is demountably anchored co-axial with the core so that, upon rotation of the latter, a strip may be applied throughout the entire circumference of the core, if desired and as preferred.

The preferred embodiment of the invention is illustrated in the accompanying drawings in which:

Fig. 1 is an elevation of a core stand or buck with the apparatus shown in working relation therewith, the core and tire appearing in section, Fig. 2 is a similar elevation, partly in section, of a part of the apparatus, the tool proper being shown in a position about to be engaged with the tire bead, Fig. 3 is a fragmentary detail, and Fig. 4 is a plan view of the apparatus complete, a part of the tire being broken away to better illustrate the construction.

In the drawings, 1 shows a stand to which is swivelled, as indicated at 2, an arm 3 on whose free end a core 4 is adapted to be supported for rotation in a horizontal plane with either of the sides uppermost for convenient access thereto. The core 4 is preferably rotatable about a spindle 5 on whose opposite ends are threaded nuts 6, a spacing collar 7 being preferably provided to locate both of the nuts 6 the same distance from the central plane of the core.

A carrier indicated generally by the numeral 8 is adapted to be slipped over either of the nuts 6, it having a collar portion 9 with a hexagonally or nut-shaped opening and an arm portion 10, which is adapted to be adjusted for different sized tires by the bolt and slot connections indicated at 11. To the carrier 8 at 12 is fulcrumed a main lever 13 which has an abutment face or stop 14 adapted, in the position shown in Fig. 2, to contact with an adjacent face of the arm portion 10 and to limit inward swinging movement of the lever. The arm portion 10 and the main lever 13 are drilled as indicated at 15 and 16 to receive a locking pin 17 for holding the former fixed relative the carrier 8 when in the relative position shown in Figure 1.

At the free end of the main lever 13 on a pin 18 is fulcrumed an auxiliary and hand operable lever 19 normally pulled upon by a lightly tensioned coiled spring 19'. The pin 18 passes through the forked extremity 19'' of the hand lever, which latter is loosely pinned as indicated at 20 intermediately of a member 21 which supports a bead engaging element 22, preferably in the form of a freely rotatable roller and grooved or notched to hold the heel of the bead with certainty.

The bead engaging element 22 as thus supported is adapted when the pin 17 is withdrawn, to be lowered to the position shown in Fig. 2 and to be inserted in any convenient manner under the heel of the tire bead. By pulling on the hand lever 18 to the left, as shown in Fig. 2, the tire bead may be pulled slightly away from the core when the rear portion 21' of the member 21 jams against the main lever 13. Thereafter continued pull upon the hand lever 19 turns the main lever 13 and element 22 as one piece about the fulcrum 12. When the holes 15 and 16 are in registration, the locking pin 17 may be inserted to hold the tire bead in the position shown in Fig. 1. In this position, an operative may freely brush cement on the exposed surface of the core 4 by turning the latter on the spindle 5.

A filling strip or pad, of suitable proportions, say, about two inches by one-eighth of an inch in cross section, and of any suitable material, such as muslin strips secured together by frictioning their opposed meeting faces, may then be introduced. Conveniently, this may be done by threading the strip between the smoothing members 23, one of which, as indicated at 24 in Fig. 4, is preferably of the concave shape illustrated. The smoothing members may be mounted in a channel plate 25 which is riveted on one end of a bar 26 that is bent, as shown, and at its opposite end provided with an open-ended slot 27 for detachable mounting on a shouldered stud 28. Intermediately, the bar 26 is provided with a lug 29 for engagement with the side of the member 21 and prevention of rotation when the core is turned. Obviously, by introducing a filling strip, such as is indicated at 30, through the smoothing members 23, the same may be laid between the core and tire, which is held locally spaced therefrom, through any desired extent of the circumference, the strip adhering to the cement that has been previously applied to the core.

It will thus be seen that we have provided a simple and efficient apparatus for cementing a core and interposing a filling strip between it and a blemished tire so that the latter, on being subsequently mounted in a mold, may have the blemished portion, or portions, of its outer surface on one or both of its sides forced to take the exact outlines of the mold. Consequently, of course, the blemished tire as re-finished appears perfect. A cure for twenty minutes at 30 pounds steam pressure will ordinarily suffice.

The construction above described in detail may be varied in many ways without departing from the principles of the invention and reference should, therefore, be made to the accompanying claims for an understanding of its scope. While the core is preferably rotatable, obviously, it could be held stationary and the tool rotated or moved circularly and concentrically thereof.

Having thus described our invention, what we claim and desire to protect by Letters Patent is:

1. In an apparatus for preparing blemished tires on cores for a re-finishing treatment, in combination, a tool adapted to hold a portion of a tire away from the core, and means for supporting the tool and core in co-operative relation permitting concentric circular movement of the one relative to the other.

2. In an apparatus for preparing blemished tires on cores for a re-finishing treatment, in combination, a tool adapted to hold a portion of a tire away from the core, mechanical means for maintaining said tool in a pre-determined spaced relation from the core and thereby spreading the tire wall from the core, and means for supporting the tool and core in co-operative relation permitting concentric circular movement of the one relative to the other.

3. In an apparatus for preparing blemished tires on cores for a re-finishing treatment, in combination, a bead engaging element, articulated members for supporting said element including a manually operative lever loosely pinned thereto, and means for supporting the members and core and permitting rotation of the core.

4. In an apparatus for preparing blemished tires on cores for a re-finishing treatment, in combination, a bead engaging element, articulated members for supporting said element including a manually operative lever loosely pinned thereto, and means for supporting the members and core on the line of the latter's axis, and permitting rotation of the core independently of the members.

5. In an apparatus for preparing blemished tires on cores for a re-finishing treatment, in combination, a bead engaging roller, a member supporting the same, a lever articulated to said member and having a relatively fixed fulcrum, a carrier for said lever's fulcrum adapted to be supported laterally of the core, and means for locking the lever to the carrier to hold the roller spaced from the core, said core and carrier being relatively movable about the axis of the core as a center.

6. In an apparatus for preparing blemished tires on cores for a re-finishing treatment, in combination, a bead engaging element, a member supporting the element, a hand lever supporting the member, a main lever loosely pinned to the hand lever and adapted to limit the extent of movement of the element by the hand lever, a carrier to which said main lever is fulcrumed, and means for supporting the carrier and core in co-operative relation permitting movement of one relative to the other.

7. In an apparatus for preparing blemished tires on cores for a re-finishing treatment, in combination, a bead engaging element, a member supporting the element, a hand lever supporting the member, a main lever loosely pinned to the hand lever and adapted to limit the extent of movement of the element by the hand lever, a carrier to which said main lever is fulcrumed, and means for locking the main lever to the carrier.

8. In an apparatus for preparing blemished tires on cores for a re-finishing treatment, in combination, a bead engaging element, a main lever, an auxiliary lever linking the element and main lever and permitting limited independent movement of the former relative to the latter, a support to which the main lever is fulcrumed, and means for limiting movement of the main lever in one direction and for locking the main lever to the support in a position holding the element spaced from the core when in operative engagement with a tire bead.

9. In an apparatus for preparing blemished tires on cores for a re-finishing treatment, in combination, a bead engaging element, means for holding a tire wall locally spaced therewith from the core, means for introducing a filling strip between the core and tire, and means permitting relative circular movement of the core and the previously mentioned means.

10. In an apparatus for preparing blemished tires on cores for a re-finishing treatment, in combination, a tire wall spreading tool, and a filling strip applying device having a plurality of spaced smoothing members supported in substantially tangential relation to the core.

11. In an apparatus for preparing blemished tires on cores for a re-finishing treatment, in combination, a tire wall spreading tool, and a demountable filling strip applying device having a means for smoothing the filling strip adjacent the core, and a common support for said device and tool adjacent the core.

12. The combination with a rotatable core, and a tool for spreading a tire locally away therefrom and supported at one side of the core, of a filling strip applying device demountably secured to the tool support and having a series of members, one of which at least is a roll, adapted to be supported in substantially tangential relation to the core, and means preventing the device and tool from rotating when the core is being rotated.

13. In an apparatus for preparing blemished tires on cores for a re-finishing treatment, in combination, a bead engaging element, means for engaging the element under the tire bead and moving it away from the core, and a support for said means adapted to be disengagedly mounted on either side of and adjacent the core and also in line with its axis.

14. In an apparatus for preparing blemished tires on cores for a re-finishing treatment, in combination, a bead engaging element, a lever hinged to the bead engaging element for permitting the latter to be moved radially outward in close proximity to and following the core, a second lever to which the first mentioned lever is fulcrumed and by which the core following movement of the element is limited, and a relatively fixed support for said second mentioned lever to which it is adapted to be secured with the element in predetermined spaced relation from the core.

Signed at Detroit, Michigan, this 9th day of June, 1921.

WILLIAM KEARNS.
HENRY P. CONNELLY.